(12) United States Patent
Chen et al.

(10) Patent No.: US 11,520,108 B2
(45) Date of Patent: Dec. 6, 2022

(54) OPTIC FIBER CONNECTING DEVICE AND OPTIC FIBER ADAPTOR THEREOF

(71) Applicants: Gloriole Electroptic Technology Corp., Kaohsiung (TW); HAKUSAN INC., Kanazawa (JP)

(72) Inventors: Li-Yun Chen, Kaohsiung (TW); Masaaki Iwamoto, Kanazawa (JP)

(73) Assignees: GLORIOLE ELECTROPTIC TECHNOLOGY CORP., Kaohsiung (TW); HAKUSAN INC., Kanazawa (JP)

( * ) Notice: Subject to any disclaimer, the term of this patent is extended or adjusted under 35 U.S.C. 154(b) by 71 days.

(21) Appl. No.: 17/016,710

(22) Filed: Sep. 10, 2020

(65) Prior Publication Data

US 2021/0223483 A1    Jul. 22, 2021

(30) Foreign Application Priority Data

Jan. 16, 2020    (TW) .................................. 109200673

(51) Int. Cl.
*G02B 6/38*    (2006.01)

(52) U.S. Cl.
CPC ......... *G02B 6/3825* (2013.01); *G02B 6/3831* (2013.01); *G02B 6/3874* (2013.01); *G02B 6/3881* (2013.01); *G02B 6/3893* (2013.01)

(58) Field of Classification Search
CPC .. G02B 6/3831; G02B 6/3874; G02B 6/3893; G02B 6/00

USPC ........................................................... 385/53
See application file for complete search history.

(56) References Cited

U.S. PATENT DOCUMENTS

| 2009/0148104 | A1* | 6/2009 | Lu | ........................ | G02B 6/3816 |
| | | | | | 385/72 |
| 2015/0355417 | A1* | 12/2015 | Takano | ................ | G02B 6/3825 |
| | | | | | 385/60 |
| 2020/0200977 | A1* | 6/2020 | Nguyen | ............... | G02B 6/3825 |

FOREIGN PATENT DOCUMENTS

| AU | 2014214983 | A1 | * | 8/2015 | ........... | G02B 6/3817 |
| CN | 1316664 | B | * | 6/2010 | ............. | G02B 6/389 |
| JP | 2001228369 | A | * | 8/2001 | ......... | H01R 13/6315 |

\* cited by examiner

*Primary Examiner* — Kaveh C Kianni
(74) *Attorney, Agent, or Firm* — Muncy, Geissler, Olds & Lowe, P.C.

(57) ABSTRACT

An optic fiber adaptor includes two flexible engaging members and two positioning walls cooperating with one another to define an insertion slot. Each engaging member has a first inclined surface and a second inclined surface disposed behind the first inclined surface. A distance between the first inclined surfaces of the engaging members decreases rearwardly so as to facilitate pushing of a casing body of a ferrule assembly into the insertion slot. A distance between the second inclined surfaces of the engaging members decreases forwardly so as to facilitate pulling of the casing body out of the insertion slot. An optic fiber connecting device having the optic fiber adaptor is also disclosed.

4 Claims, 7 Drawing Sheets

OPTIC FIBER CONNECTING DEVICE AND OPTIC FIBER ADAPTOR THEREOF

CROSS-REFERENCE TO RELATED APPLICATION

This application claims priority of Taiwanese Utility Model Patent Application No. 109200673, filed on Jan. 16, 2020.

FIELD

The disclosure relates to a connecting device, more particularly to an optic fiber connecting device and an optic fiber adaptor thereof.

BACKGROUND

Referring to FIGS. 1 and 2, a conventional optic fiber adapter 1 for interconnecting a Multi-Fiber Push On (MPO) type ferrule assembly and a Mechanical Transfer (MT) type optic fiber adaptor has two ends for connecting with the MPO type ferrule assembly 2 and the MT type optic fiber connector (not shown), respectively.

The adaptor 1 includes a casing 11, and two hooks 12 disposed on the casing 11. The casing 11 defines a connecting slot 111 for the optic fiber connector to extend thereinto. The hooks 12 and the casing 11 cooperatively define an insertion slot 121 communicated spatially with the connecting slot 111. When the ferrule assembly 2 is inserted into the insertion slot 121, it first abuts against and pushes the hooks 12 to deform outwardly. Then, when the ferrule assembly 2 is fully inserted, each of the hooks 12 returns resiliently to its original position to thereby position the ferrule assembly 2 relative to the adaptor 1.

However, once the ferrule assembly 2 has been confined between the hooks 12, it cannot be moved in the reverse direction to separate from the adaptor 1. As the sizes of the hooks 12 are relatively small, tools must be used to flex the hooks 12 outward so as to allow the ferrule assembly 2 to be detached from the adaptor 1.

SUMMARY

Therefore, the object of the disclosure is to provide an optic fiber connecting device and an optic fiber adaptor thereof that can alleviate the drawback of the prior art.

According to one aspect of the disclosure, an optic fiber connecting device includes an optic fiber adaptor, an optic fiber connector, and a ferrule assembly.

The optic fiber adaptor includes an adaptor casing surrounding and defining a connecting slot that extends along a first direction, two flexible engaging members disposed on the adaptor casing and spaced apart from each other along a second direction transverse to the first direction, and two positioning walls disposed on the adaptor casing, spaced apart from each other along a third direction transverse to the first and second directions, and cooperating with the engaging members to define an insertion slot that is in spatial communication with the connecting slot.

The optic fiber connector is disposed behind the optic fiber adaptor along the first direction and is inserted into the connecting slot of the optic fiber adaptor.

The ferrule assembly is disposed in front of the optic fiber adaptor and includes a casing body inserted into the insertion slot of the optic fiber adaptor, two fiber-receiving tubes extending fixedly through the casing body, and a securing member disposed on the casing body and fixed to the fiber-receiving tubes.

Each of the engaging members includes an extending wall portion and a latch portion. The latch portions of the engaging members extend respectively from the extending wall portions of the engaging members toward each other. Each of the latch portions has a first inclined surface and a second inclined surface disposed behind the first inclined surface. A distance between the first inclined surfaces of the latch portions of the engaging members decreases rearwardly, so as to facilitate pushing of the casing body into the insertion slot. A distance between the second inclined surfaces of the latch portions of the engaging members decreases forwardly, so as to facilitate pulling of the casing body out of the insertion slot.

The securing member of the ferrule assembly abuts against the second inclined surfaces of the latch portions of the engaging members, such that the casing body of the ferrule assembly is confined and positioned within the insertion slot of the optic fiber adaptor.

According to another aspect of the disclosure, an optic fiber adaptor includes an adaptor casing surrounding and defining a connecting slot extending along a first direction, two flexible engaging members disposed on the adaptor casing and spaced-apart from each other along a second direction transverse to the first direction, and two positioning walls disposed on the adaptor casing, spaced apart from each other along a third direction transverse to the first and second directions, and cooperating with the engaging members to define an insertion slot.

Each of the engaging members includes an extending wall portion and a latch portion. The latch portions of the engaging members extend respectively from the extending wall portions of the engaging members toward each other. Each of the latch portions has a first inclined surface and a second inclined surface disposed behind the first inclined surface. A distance between the first inclined surfaces of the latch portions of the engaging members decreases rearwardly. A distance between the second inclined surfaces of the latch portions of the engaging members decreases forwardly.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
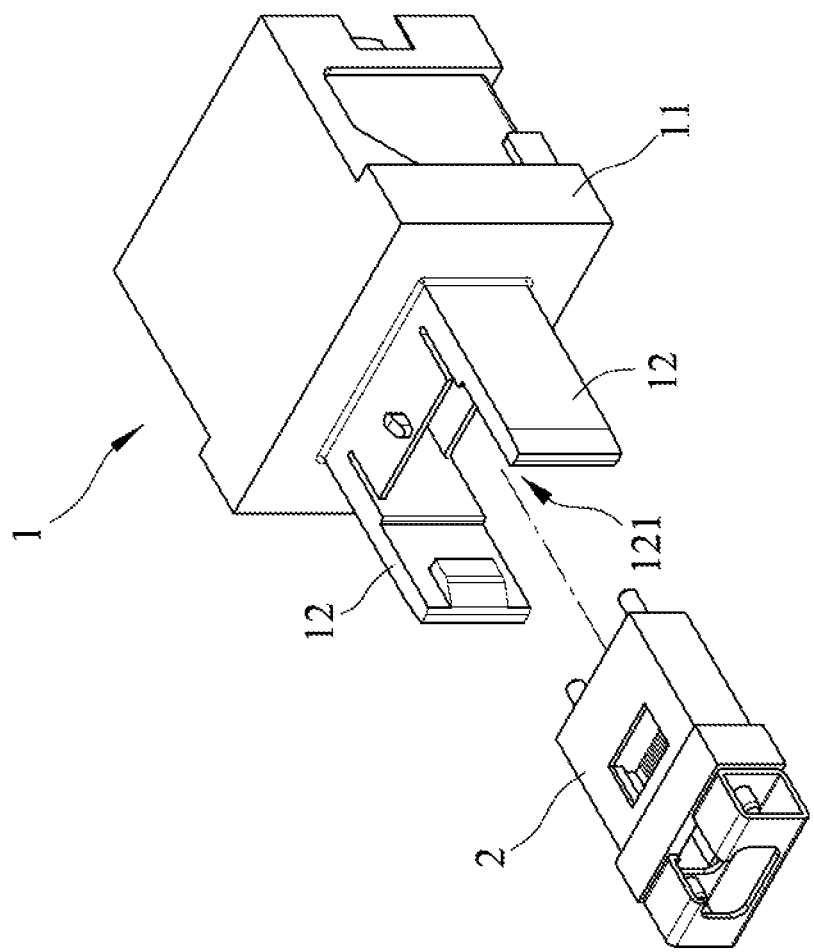
FIG. 1 is a perspective view of conventional adaptor and ferrule assembly.
Figure 2:
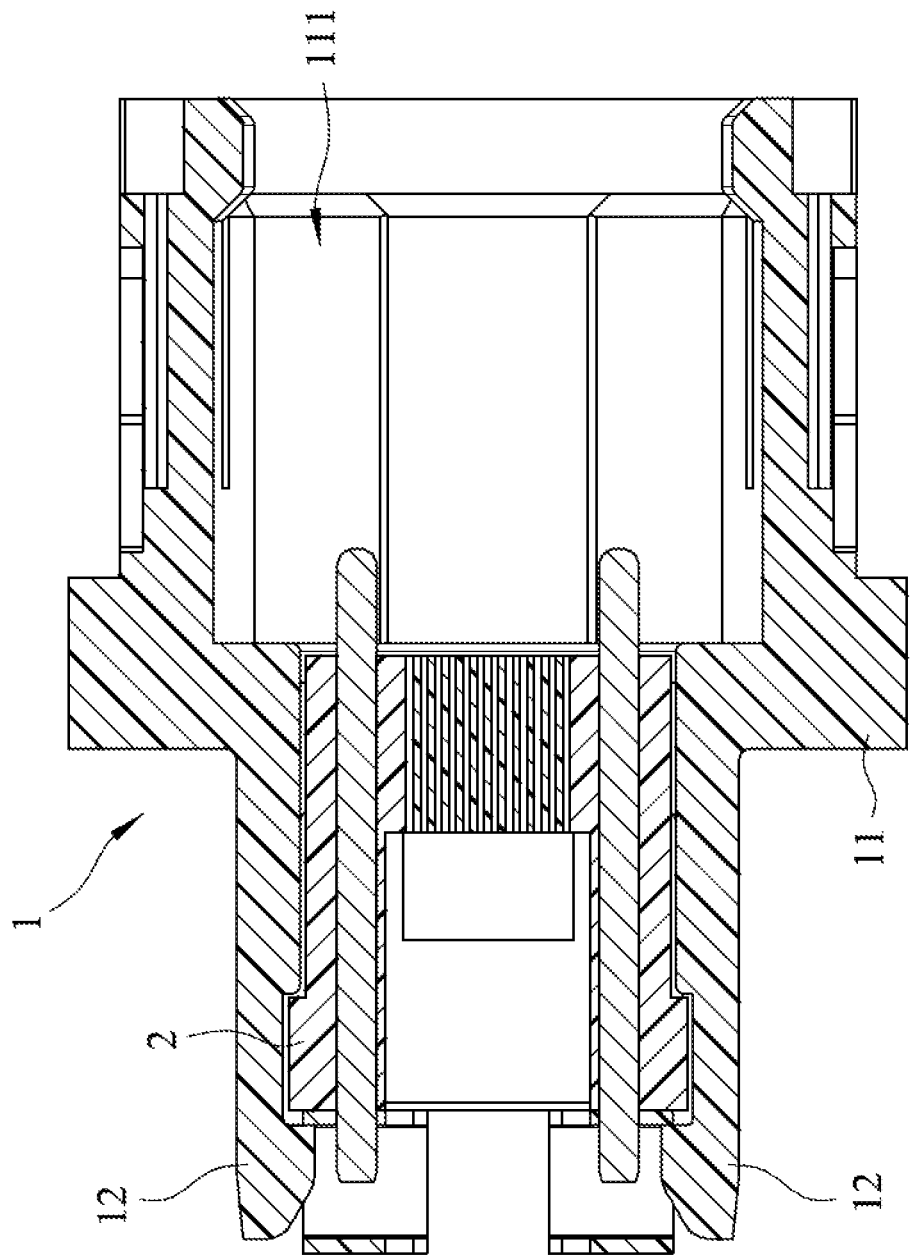
FIG. 2 is a sectional view of the conventional adaptor and ferrule assembly.
Figure 3:
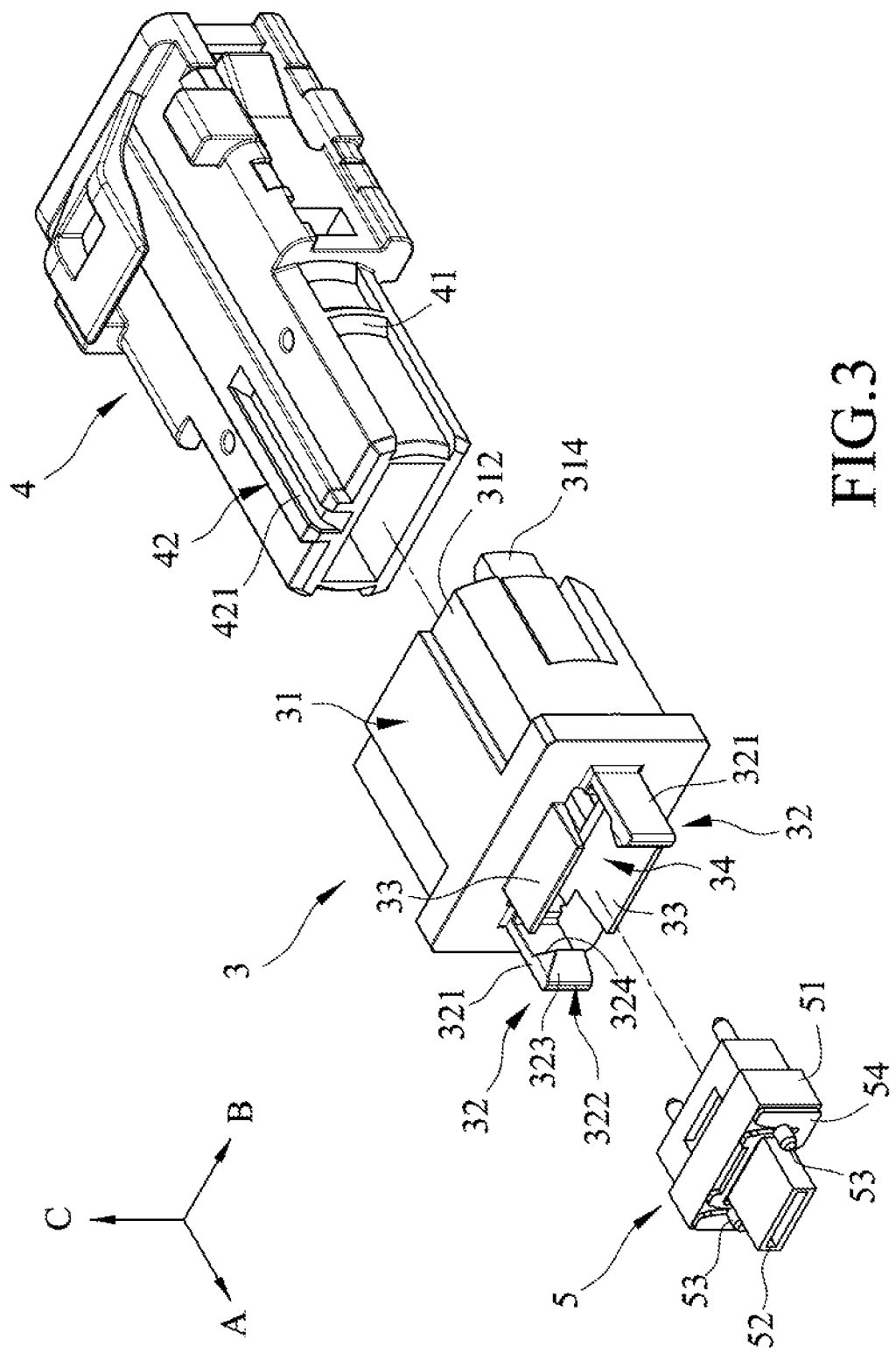
FIG. 3 is a perspective view of an embodiment of an optic fiber connecting device according to the disclosure.
Figure 4:
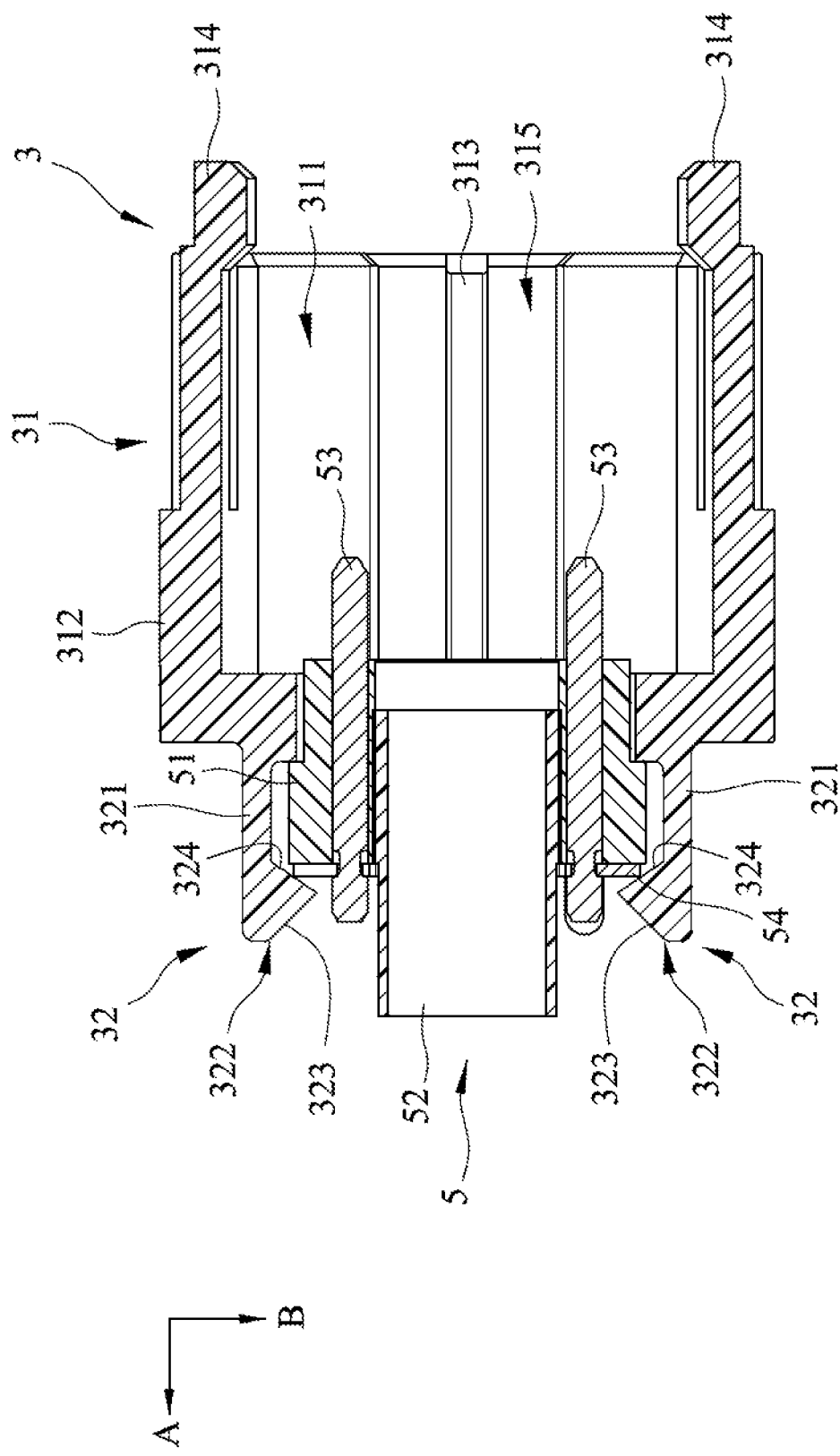
FIG. 4 is a sectional view of the embodiment.
Figure 5:
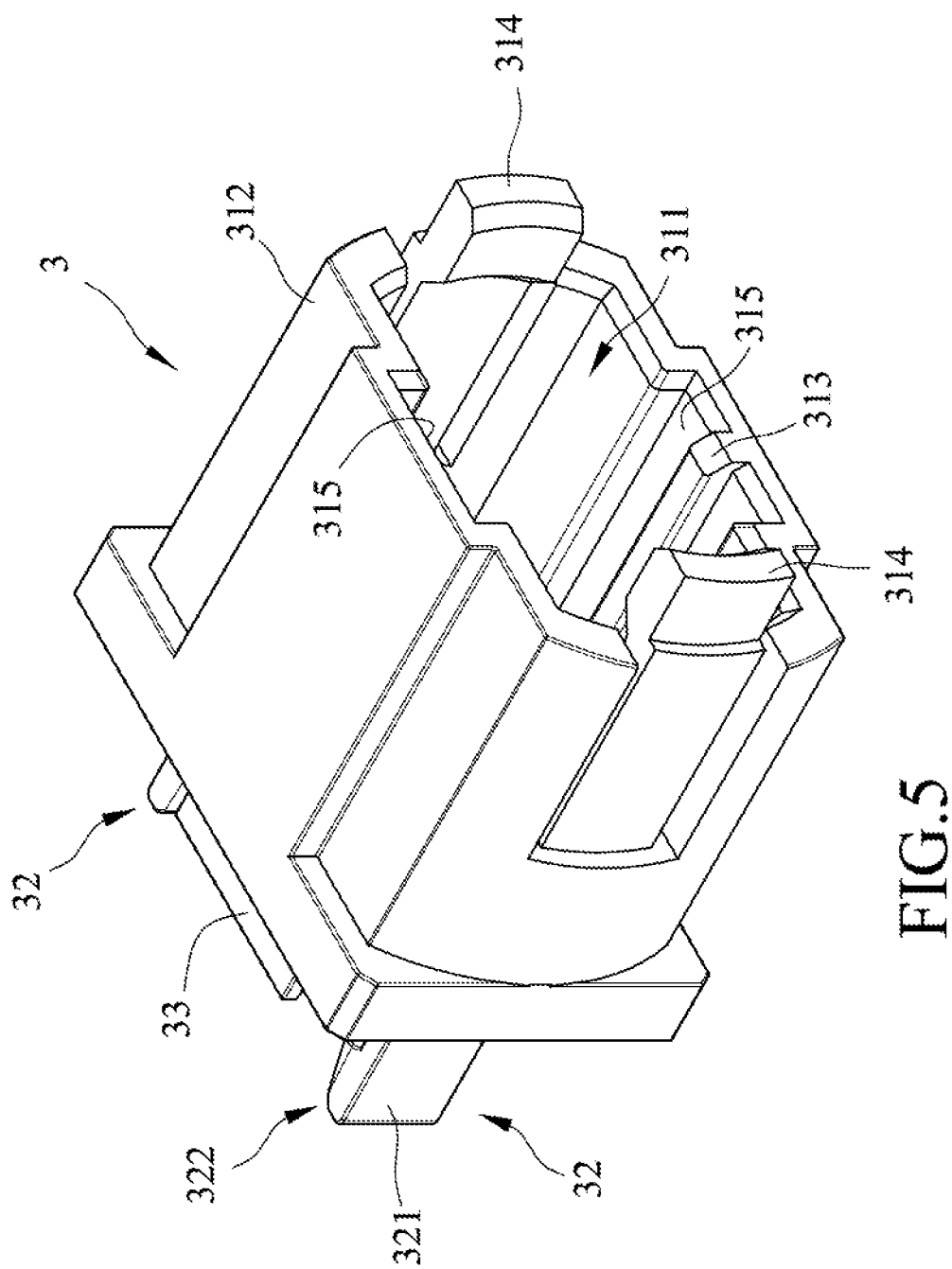
FIG. 5 is a perspective view of an optic fiber adaptor of the embodiment.

Referring to FIGS. 3 to 5, an embodiment of an optic fiber connecting device includes an optic fiber adaptor 3, an optic fiber connector 4, and a ferrule assembly 5 including a casing body 51.

The optic fiber adaptor 3 includes an adaptor casing 31 surrounding and defining a connecting slot 311 that extends along a first direction (A), two flexible engaging members 32 disposed on the adaptor casing 31 and spaced apart from each other along a second direction (B) that is transverse to the first direction (A), and two positioning walls 33 disposed on the adaptor casing 31, spaced apart from each other along a third direction (C) that is transverse to the first and second directions (A), (B). The positioning walls 33 cooperate with the engaging members 32 to define an insertion slot 34. The insertion slot 34 has a smaller dimension than the connecting slot 311 and is in spatial communication with the connecting slot 311.

The adaptor casing 31 has a surrounding wall portion 312 surrounding and defining the connecting slot 311, and two hook portions 314 connected to the surrounding wall portion 312 and spaced apart from each other along the second direction (B). The adaptor casing 31 further has a foolproof protrusion 313 that protrudes along the third direction (C) from the surrounding wall portion 312. The surrounding wall portion 312 further defines two keyways 315 spaced apart from and opening toward each other along the third direction (C), and in spatial communication with the connecting slot 311 along the third direction (C). The foolproof protrusion 313 is disposed in one of the keyways 315. The hook portions 314 are spaced apart from each other, extend along the first direction (A) away from the engaging members 32, and retain a portion of the optic fiber connector 4 therebetween.

Each of the engaging members 32 includes an extending wall portion 321 extending forwardly from the adaptor casing 31 along the first direction (A) and a latch portion 322. The latch portions 322 of the engaging members 32 extend respectively from the extending wall portions 321 of the engaging members 32 toward each other along the second direction (B). Each of the latch portions 322 has a first inclined surface 323 and a second inclined surface 324 disposed behind the first inclined surface 32. A distance between the first inclined surfaces 323 of the latch portions 322 of the engaging members 32 decreases rearwardly, so as to facilitate pushing of the casing body 51 into the insertion slot 34, and a distance between the second inclined surfaces 324 of the latch portions 322 of the engaging members 32 decreases forwardly, so as to facilitate pulling of the casing body 51 out of the insertion slot 34. In this embodiment, the first and second inclined surfaces 323, 324 of the latch portion 322 of each of the engaging members 32 are connected to each other.

The optic fiber connector 4 is a MT type connector, is disposed behind the optic fiber adaptor 3 along the first direction (A), and is inserted into the connecting slot 311 of the optic fiber adaptor 3. The optic fiber connector 4 has two retaining protrusions (only one shown) and a polarity key 42. In this embodiment, the polarity key 42 is formed with a groove 421.

The ferrule assembly 5 is a MPO type connector. The casing body 51 is inserted into the insertion slot 34 of the optic fiber adaptor 3. The ferrule assembly 5 further includes a connecting seat 52 connected to the casing body 51, two fiber-receiving tubes 53 extending fixedly through the casing body 51, and a securing member 54 disposed on the casing body 51 and fixed to the fiber-receiving tubes 53. The securing member 54 of the ferrule assembly 5 abuts against the second inclined surfaces 324 of the latch portions 322 of the engaging members 32, such that the casing body 51 of the ferrule assembly 5 is confined and positioned within the insertion slot 34 of the optic fiber adaptor 3.

To connect the ferrule assembly 5 and the optic fiber adaptor 3, the ferrule assembly 5 is pushed rearwardly into the insertion slot 34, so that two sides of the casing body 51 opposite along the second direction (B) are pressed against the first inclined surfaces 323 of the latch portions 322 to flex the engaging members 32 outwardly due to the fact that the distance between the first inclined surfaces 323 decreases rearwardly, thereby allowing the ferrule assembly 5 to be pushed into the insertion slot 34. Once the securing member 54 of the ferrule assembly 52 passes the first inclined surfaces 323, the engaging members 32 resiliently returns to its original shape and the second inclined surfaces 324 of the engaging members 32 abut against the securing member 54 of the ferrule assembly 5 to secure the ferrule assembly 5 to the optic fiber adaptor 3. To remove the ferrule assembly 5 from the optic fiber adaptor 3, the ferrule assembly 5 is pulled forwardly so that the securing member 54 of the ferrule assembly 5 is pressed against the second inclined surfaces 324 to flex the engaging members 32 outwardly due to the fact that the distance between the second inclined surfaces 324 decreases forwardly, thereby allowing the ferrule assembly 5 to be pulled out from the insertion slot 34. Due to the configuration of the first and second inclined surfaces 323, 324 of the engaging members 32, no tool is needed to be use on the engaging members 32 for removing the ferrule assembly 5 from the optic fiber adaptor 3.

Referring to FIGS. 3, 5, 6, and 7, to connect the optic fiber connector 4 to the optic fiber adaptor 3, the optic fiber connector 4 is pushed forwardly into the connecting slot 311 of the adaptor casing 31 to flex the hook portions 314 of the adaptor casing 31 outward. When connection is completed, the hook portions 314 of the adaptor casing 31 are engaged with the retaining protrusions 41 of the optic fiber connector 4 so as to secure the optic fiber connector 4 to the optic fiber adaptor 3. To detach the optic fiber connector 4 from the optic fiber adaptor 3, a force is applied to the retaining protrusions 41 so as to disconnect the retaining protrusions 41 from the hook portions 314.

Figure 6:
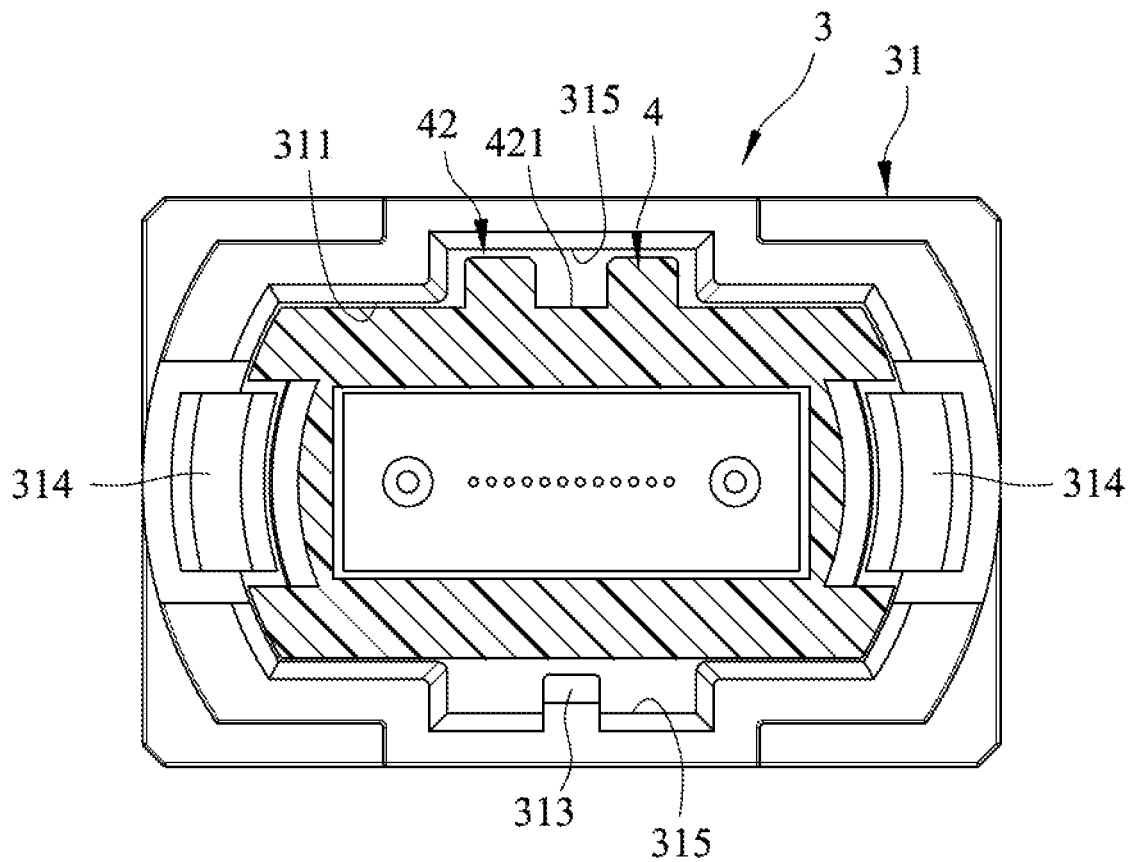
FIG. 6 is a sectional view of the embodiment, illustrating an optic fiber connector of the embodiment inserted into the optic fiber adaptor.
Figure 7:
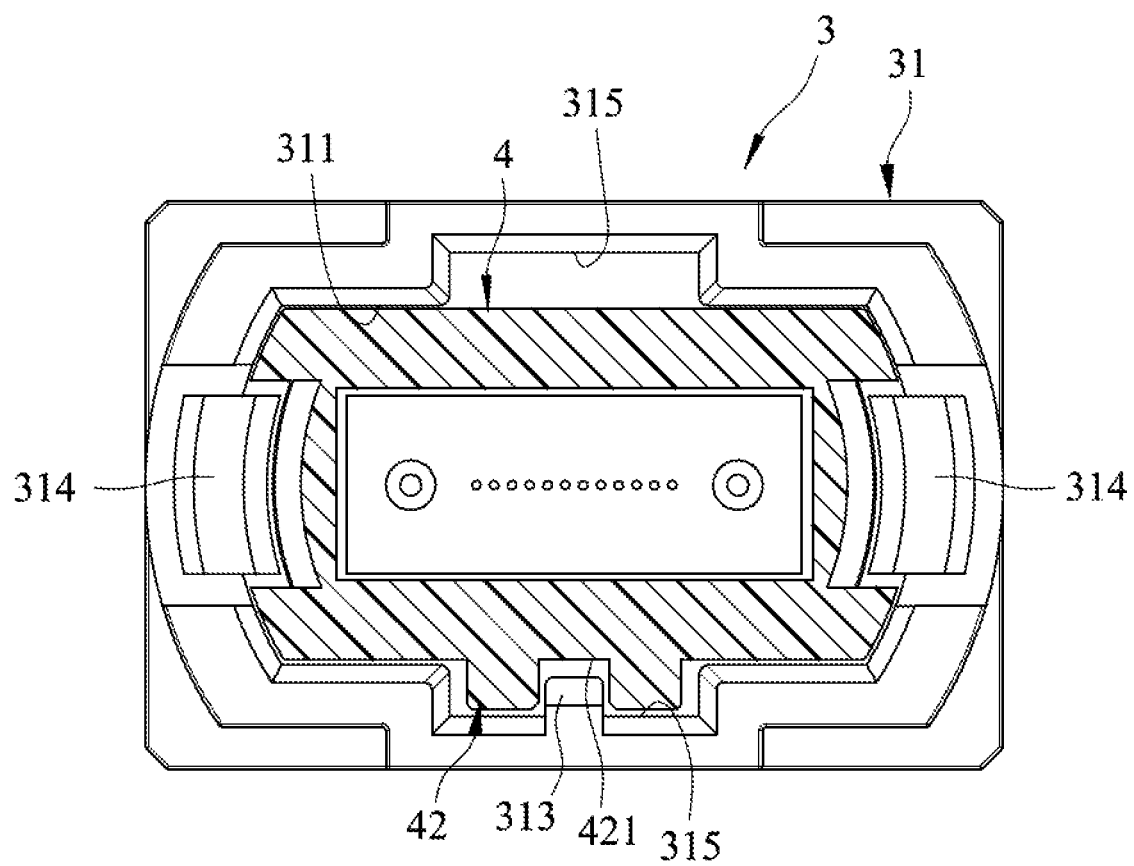
FIG. 7 is similar to FIG. 6 but illustrating the optic fiber connector inserted in a reverse orientation into the optic fiber adaptor.

Further referring to FIGS. 6 and 7, it should be noted that the optic fiber connector 4 of this embodiment may be connected to the optic fiber adaptor 3 with different polarities due to the provision of the groove 421 formed in the polarity key 42. The groove 421 corresponds in shape and position with the foolproof protrusion 313 disposed in one of the keyways 315 so that either of the keyways 315 can be engaged with the polarity key 42, thereby allowing for easy change of the polarity. With the presence of the groove 42 formed in the polarity key 42 and engageable with the foolproof protrusion 313, the optic fiber connector 4 may be inserted into the connecting slot 311 without being blocked by the foolproof protrusion 313. In other embodiments, the optic fiber adaptor 3 may be used in conjunction with a conventional optic fiber connector (not shown), in which case the foolproof protrusion 313 will block the polarity key thereof from entering a corresponding one of the keyways 315, thereby preventing the conventional optic fiber connector from being inserted in the wrong orientation.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optic fiber adaptor comprising:
   an adaptor casing surrounding and defining a connecting slot extending along a first direction;
   two flexible engaging members disposed on said adaptor casing and spaced-apart from each other along a second direction transverse to the first direction; and
   two positioning walls disposed on said adaptor casing, spaced apart from each other along a third direction transverse to the first and second directions, and cooperating with said engaging members to define an insertion slot,
   wherein each of said engaging members includes an extending wall portion, and a latch portion, said latch portion of each of said engaging members extends from said extending wall portion of said engaging members toward said latch portion of another one of engaging members, each of said latch portions has a first inclined surface and a second inclined surface that is disposed behind said first inclined surface, a distance in the second direction between said first inclined surface of said latch portion of one of said engaging members and said first inclined surface of said latch portion of the other one of said engaging members decreases rearwardly, a distance in the second direction between said second inclined surface of said latch portion of one of said engaging members and said second inclined surface of said latch portion of the other one of said engaging members decreases forwardly;
   wherein said first inclined surface of said latch portion of one of said engaging members faces said first inclined surface of said latch portion of the other one of said engaging members in the second direction; and
   wherein said second inclined surface of said latch portion of one of said engaging members faces said second inclined surface of said latch portion of the other one of said engaging members in the second direction.

2. The optic fiber adaptor as claimed in claim 1, wherein said first and second inclined surfaces of said latch portion of each of said engaging members are connected to each other.

3. The optic fiber adaptor as claimed in claim 1, wherein said adaptor casing of said optic fiber adaptor includes a surrounding wall portion and a foolproof protrusion that protrudes from said surrounding wall portion, said surrounding wall portion defines two keyways that are spaced apart from and open toward each other along the third direction and that are in spatial communication with said connecting slot along the third direction, and said foolproof protrusion is disposed in one of said keyways.

4. The optic fiber adaptor as claimed in claim 3, wherein said adaptor casing further includes two hook portions connected to said surrounding wall portion, spaced apart from each other, and adapted for retaining a portion of said optic fiber connector therebetween.

\* \* \* \* \*